April 14, 1931. N. J. PERRY Re. 18,044

KNITTING MACHINE

Original Filed Dec. 29, 1919 11 Sheets-Sheet 1

Inventor
Napoleon J. Perry
By Bradford Morrilly Birman
Attorneys

April 14, 1931. N. J. PERRY Re. 18,044

KNITTING MACHINE

Original Filed Dec. 29, 1919 11 Sheets-Sheet 2

Inventor
Napoleon J. Perry

By Bradford Morrill Bierman Attorneys

April 14, 1931. N. J. PERRY Re. 18,044

KNITTING MACHINE

Original Filed Dec. 29, 1919 11 Sheets-Sheet 3

Inventor
Napoleon J. Perry

By Bradford, Morrill & Simmons
Attorneys.

April 14, 1931. N. J. PERRY Re. 18,044

KNITTING MACHINE

Original Filed Dec. 29, 1919 11 Sheets-Sheet 4

Inventor
Napoleon J. Perry

By Bradford Morrill Birman
Attorney

April 14, 1931. N. J. PERRY Re. 18,044
KNITTING MACHINE
Original Filed Dec. 29, 1919 11 Sheets-Sheet 5
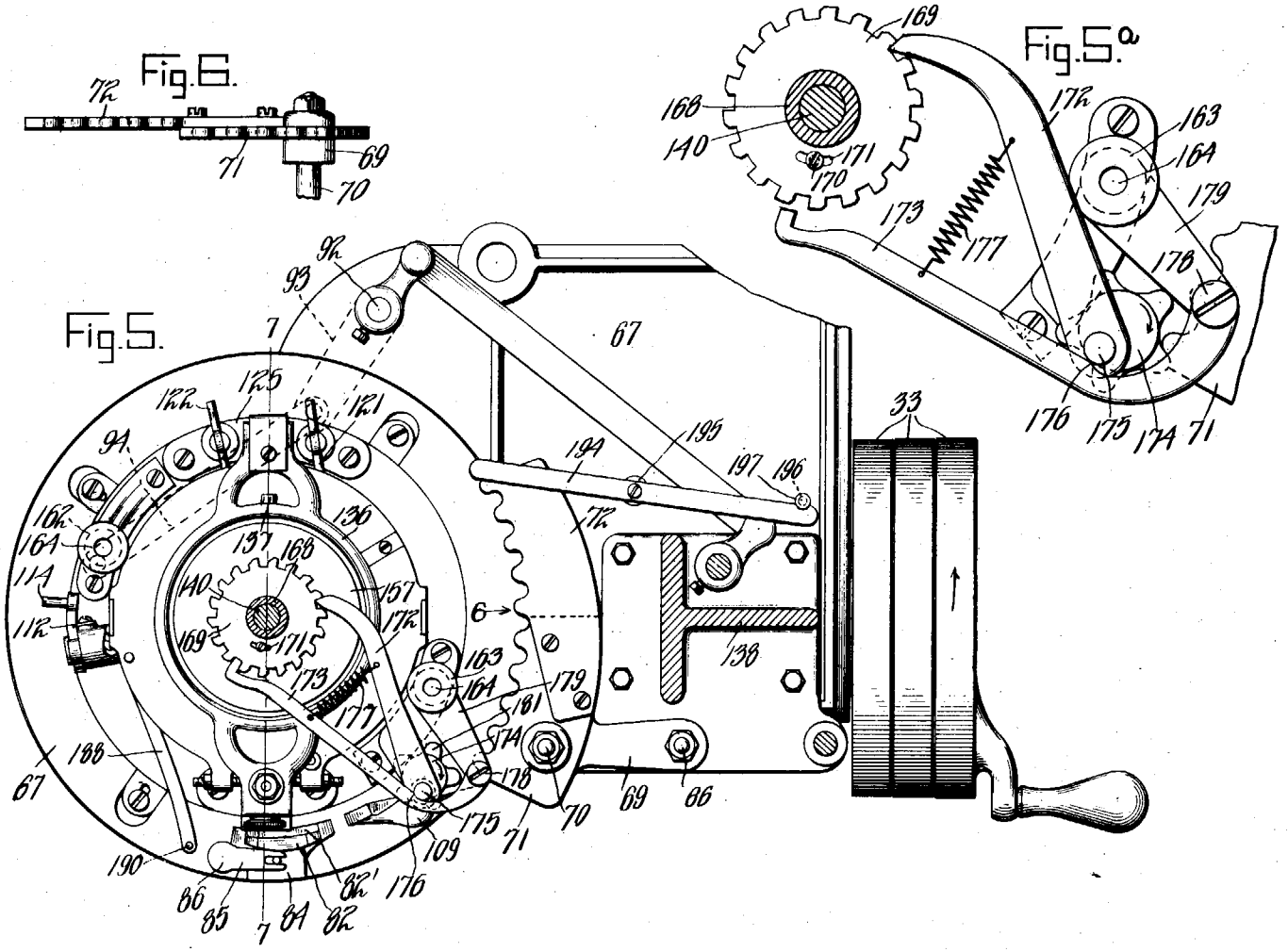
Inventor
Napoleon J. Perry
By Bradford Morrill Birman Attorneys April 14, 1931. N. J. PERRY Re. 18,044

KNITTING MACHINE

Original Filed Dec. 29, 1919 11 Sheets-Sheet 6

Inventor
Napoleon J. Perry

By Bradford Morrill Birman
Attorneys

N. J. PERRY
April 14, 1931. KNITTING MACHINE Re. 18,044
Original Filed Dec. 29, 1919 11 Sheets-Sheet 7
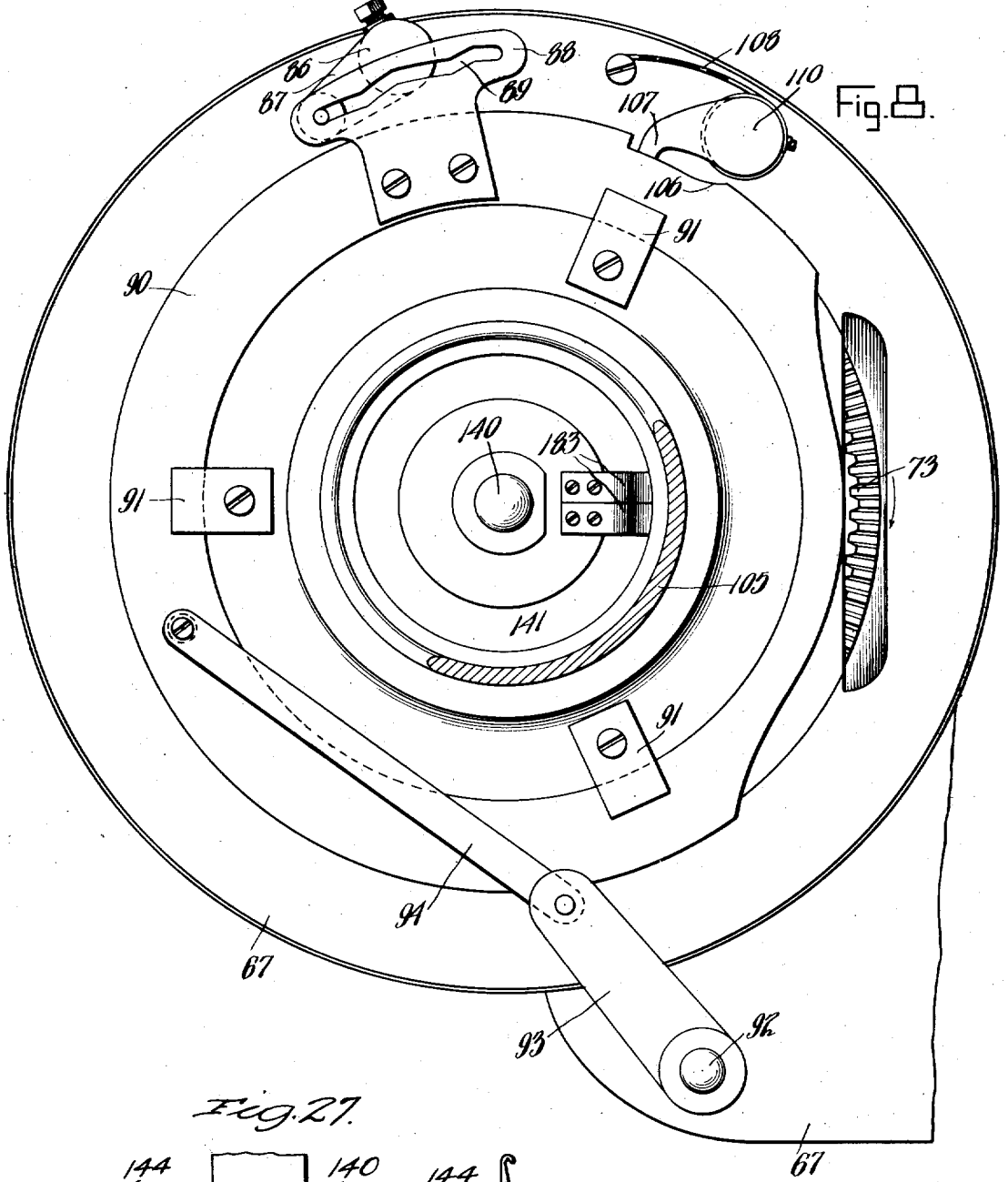
Fig. 27.
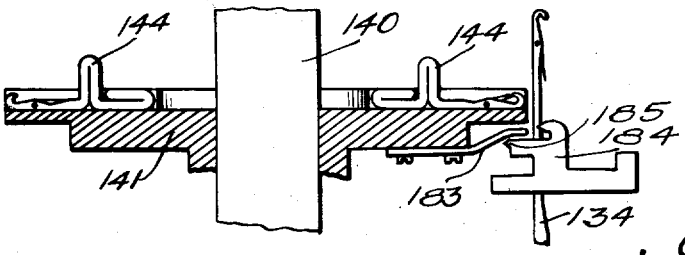
Inventor
Napoleon J. Perry
By Bradford Morrill Birman Attorneys April 14, 1931. N. J. PERRY Re. 18,044
KNITTING MACHINE
Original Filed Dec. 29, 1919 11 Sheets-Sheet 8
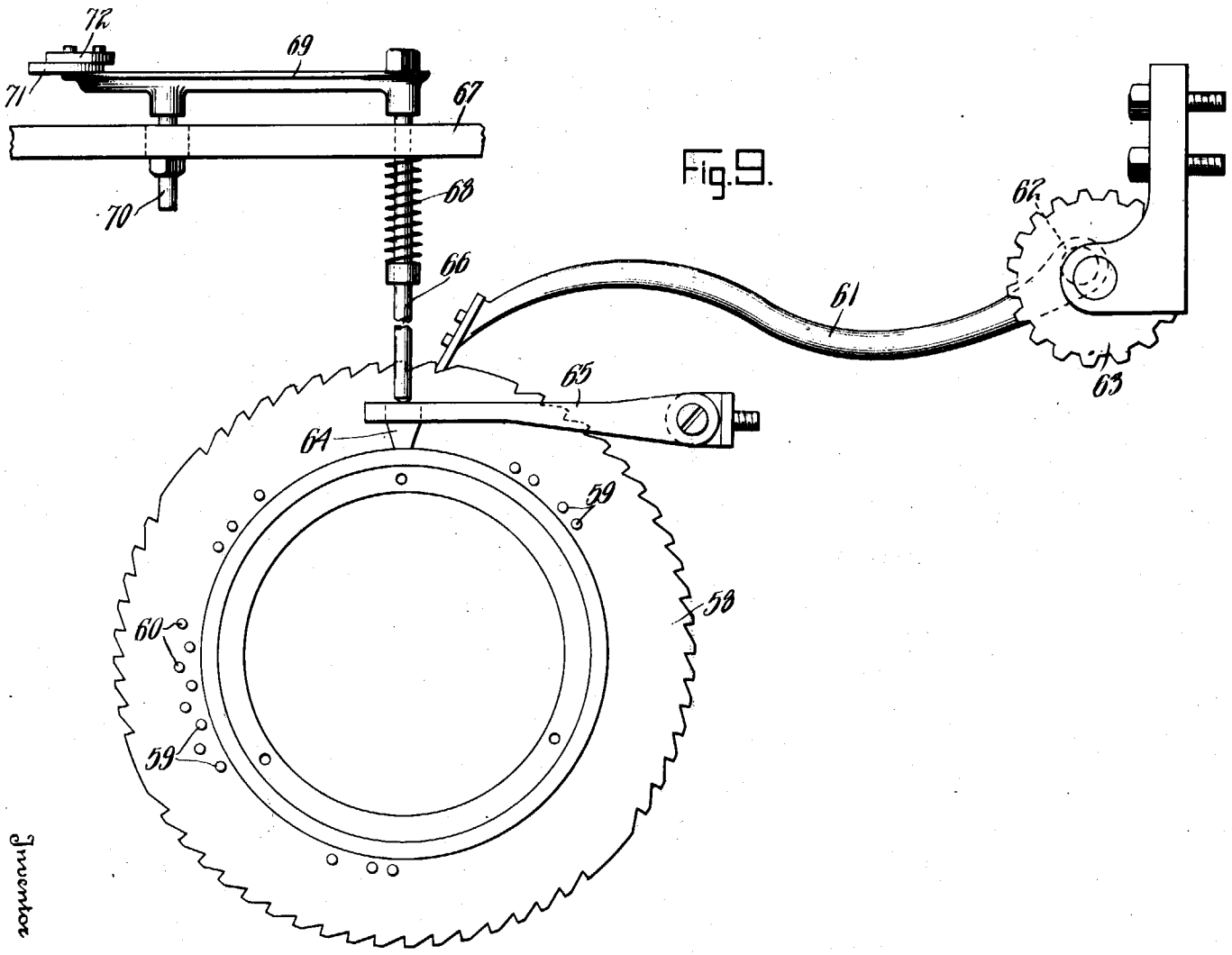
Inventor
Napoleon J. Perry
By Bradford Morrill Birman
Attorneys April 14, 1931.
N. J. PERRY
KNITTING MACHINE
Re. 18,044
Original Filed Dec. 29, 1919 11 Sheets-Sheet 9
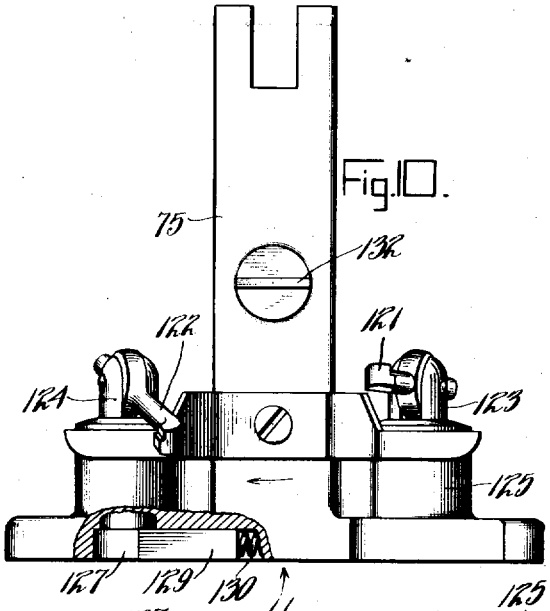
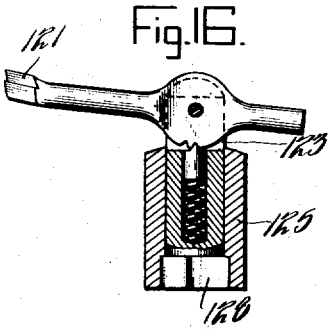
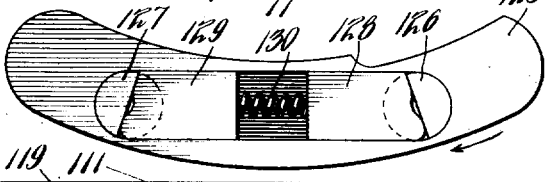
Fig. 11.
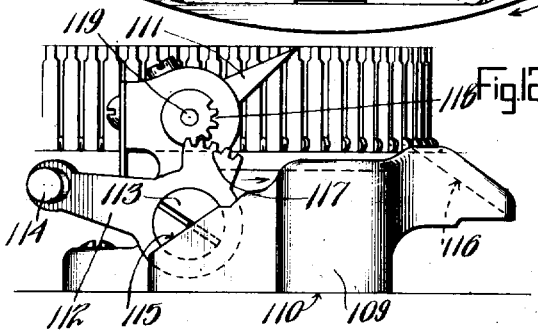
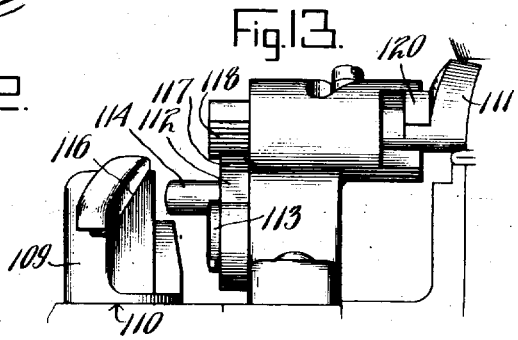
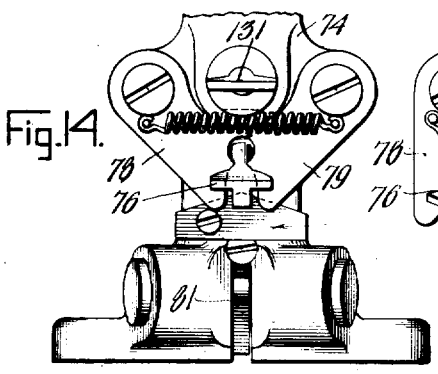
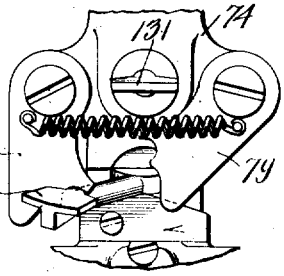
Inventor
Napoleon J. Perry
By Bradford Morrill & Birman
Attorneys April 14, 1931. N. J. PERRY Re. 18,044

KNITTING MACHINE

Original Filed Dec. 29, 1919 11 Sheets-Sheet 10

Inventor
Napoleon J. Perry

By Bradford Morrilly Fisman
Attorneys

April 14, 1931.
N. J. PERRY
KNITTING MACHINE
Re. 18,044
Original Filed Dec. 29, 1919 11 Sheets-Sheet 11
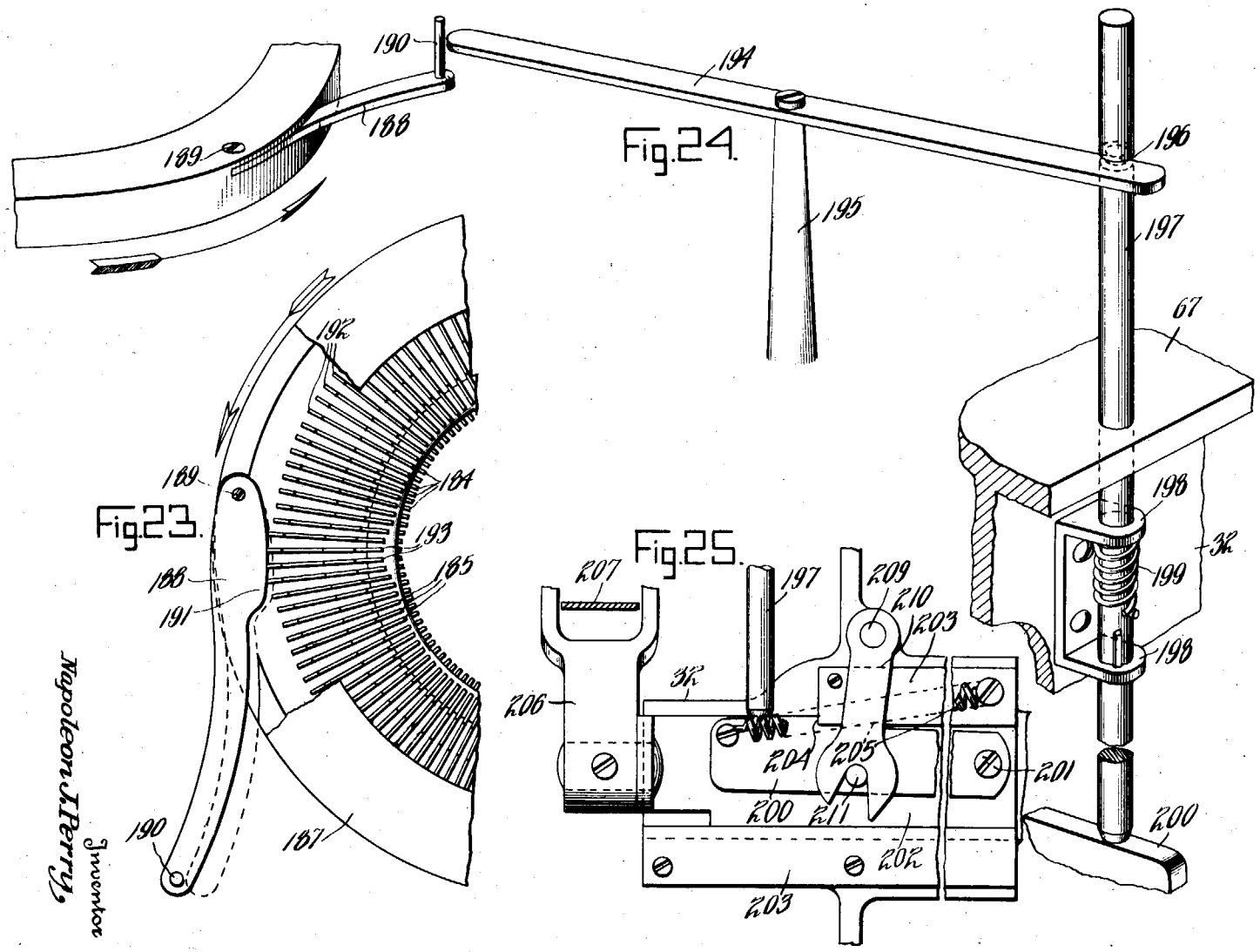
Inventor
Napoleon J. Perry,
By Bradford Morrill Birnau
Attorney Reissued Apr. 14, 1931

Re. 18,044

UNITED STATES PATENT OFFICE

NAPOLEON J. PERRY, DECEASED, LATE OF NASHVILLE, TENNESSEE, BY MAY HOSIERY MILLS, ASSIGNEE, OF NASHVILLE, TENNESSEE

KNITTING MACHINE

Original No. 1,702,839, dated February 19, 1929, Serial No. 348,071, filed December 29, 1919. Renewed March 24, 1927. Application for reissue filed January 14, 1931. Serial No. 508,780.

This invention relates to knitting machines and has for an object to provide a machine embodying new and improved features of convenience, reliability, adaptability, whereby a plain cylindrical knitting machine is converted into a machine for selectively knitting plain or ribbed as the conditions of knitting may make necessary or desirable.

Figure 1:
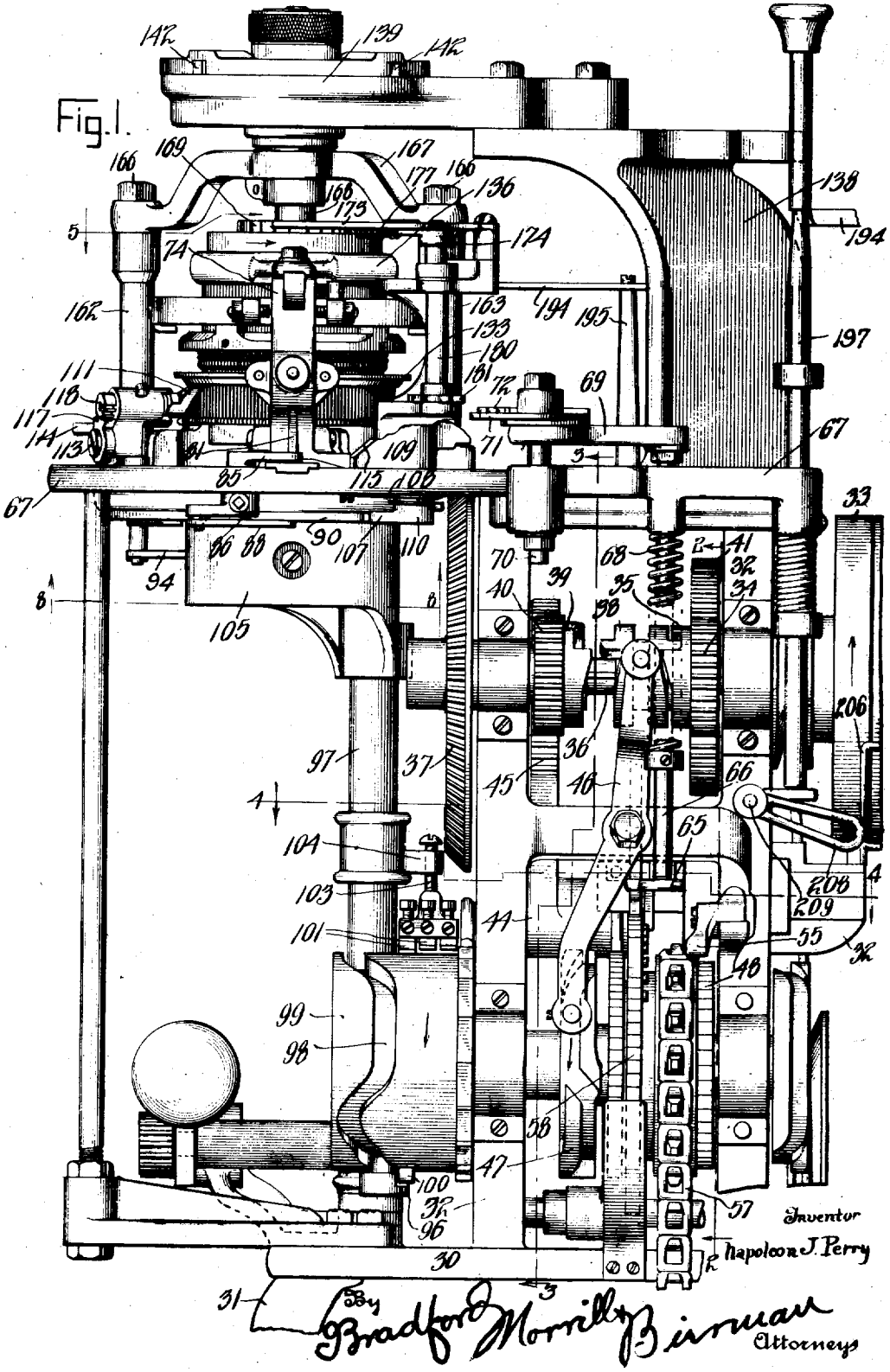
Figure 2:
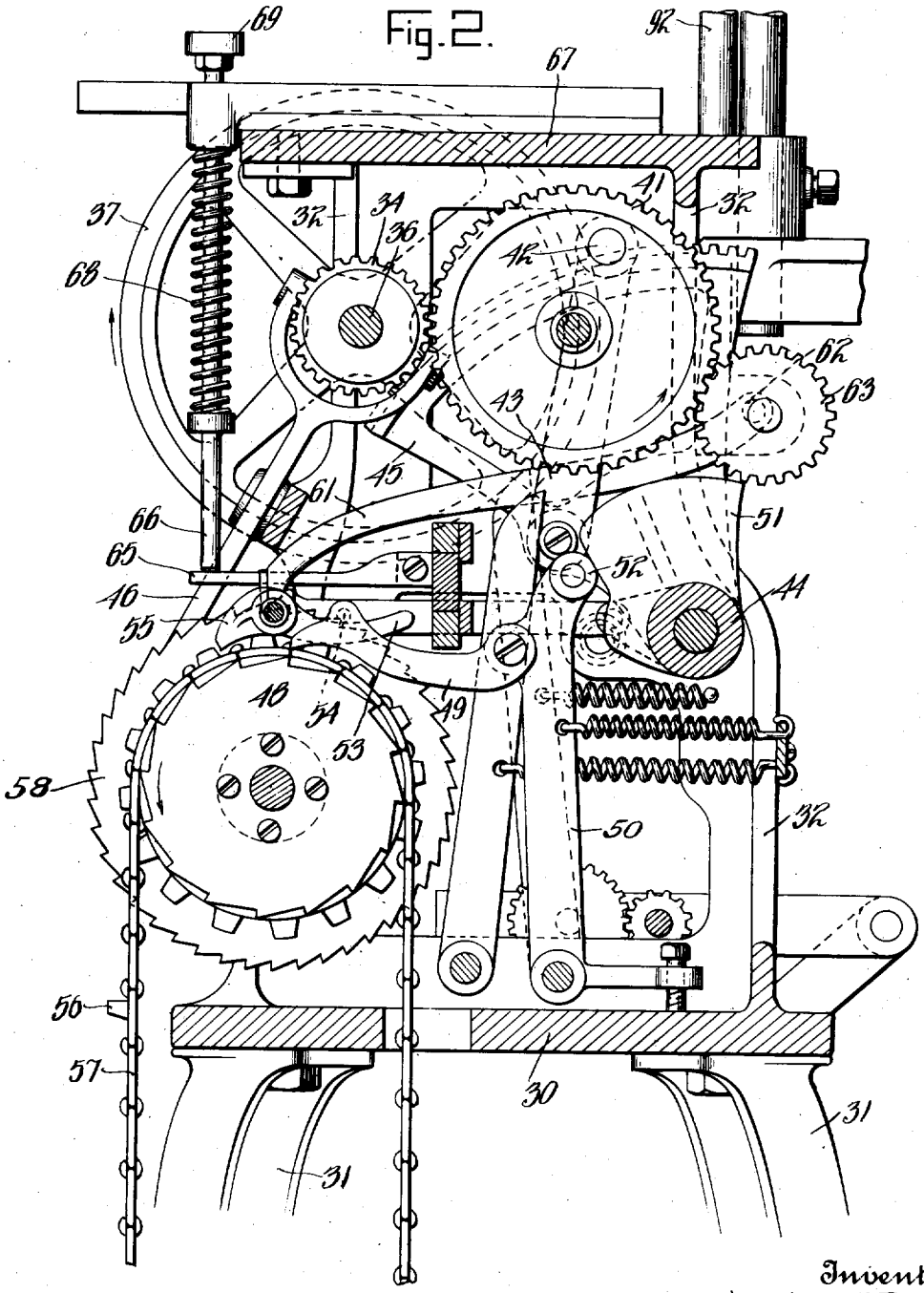
Figure 3:
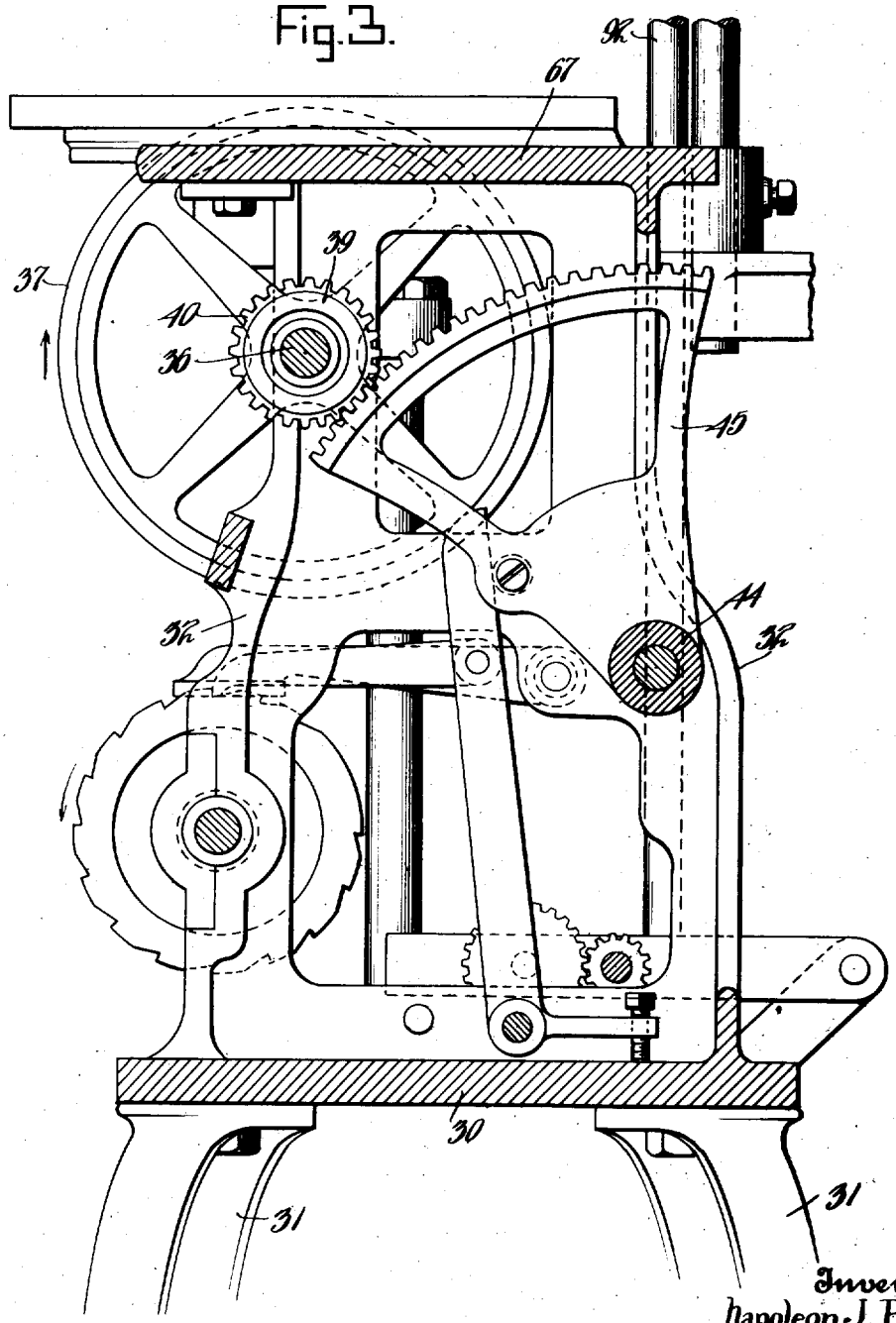
Figure 4:
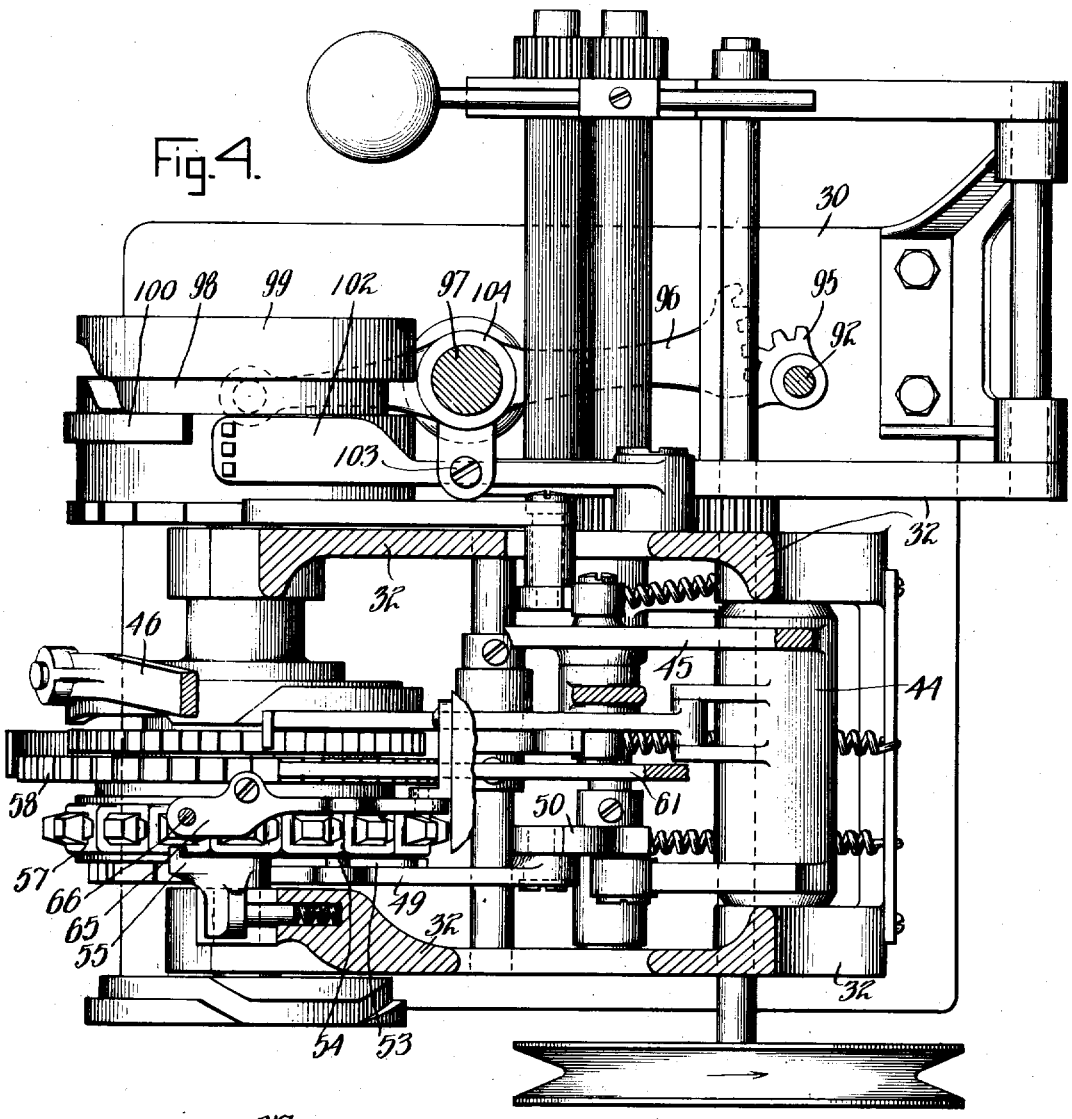
Figure 26:
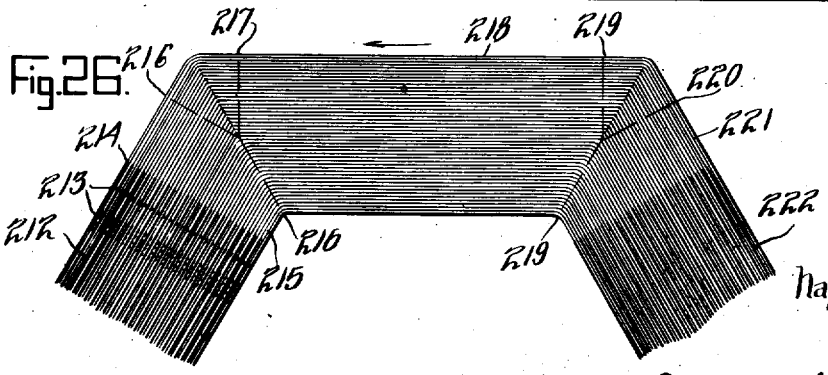
Figure 7:
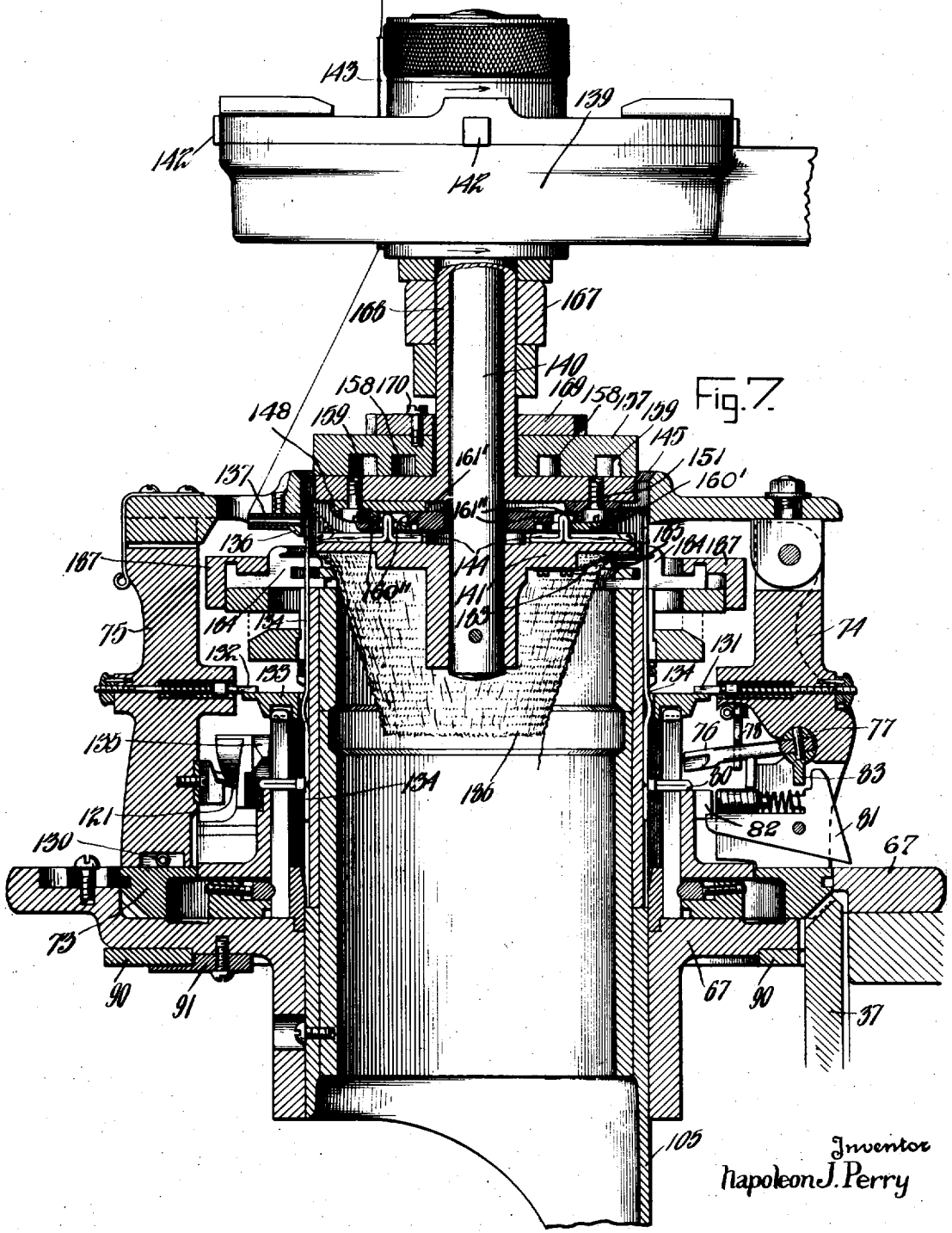
Figure 17:
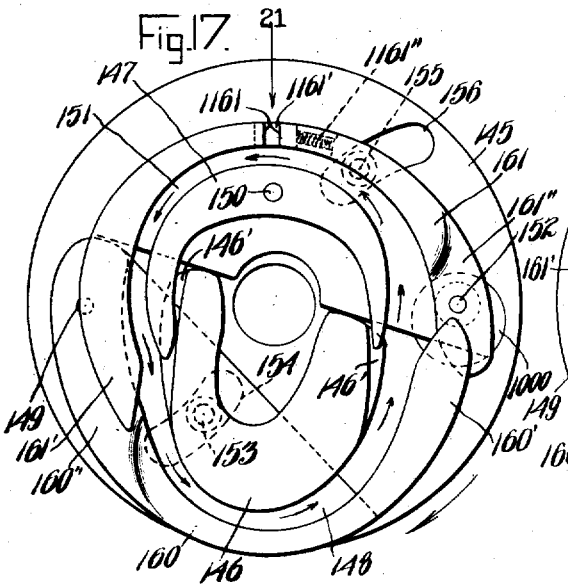
Figure 18:
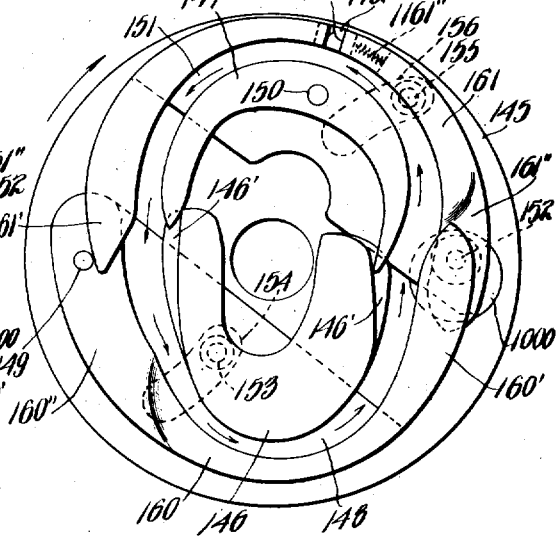
Figure 19:
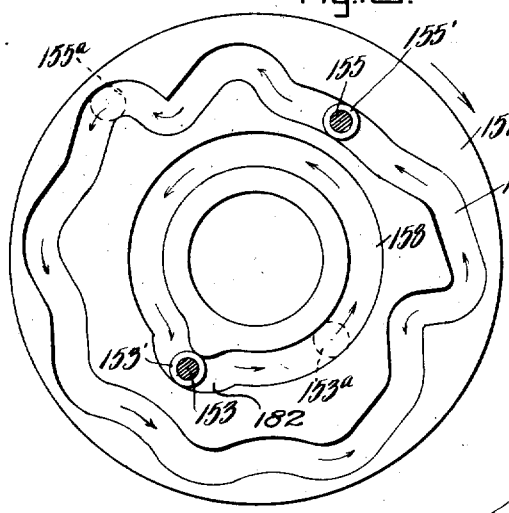
Figure 20:
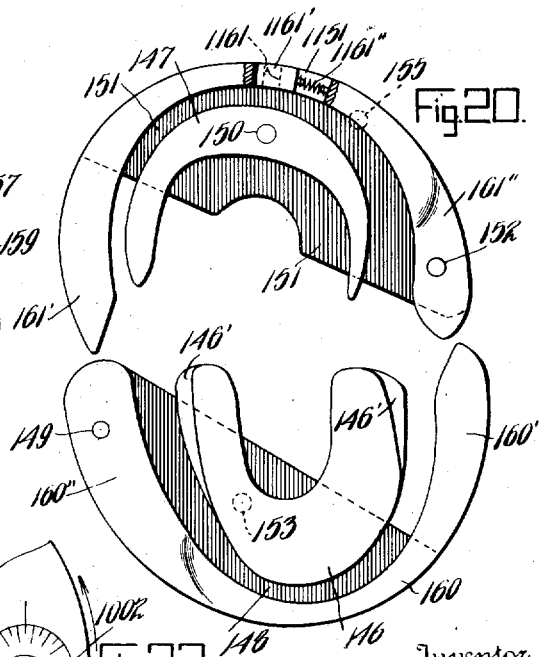
Figure 21:
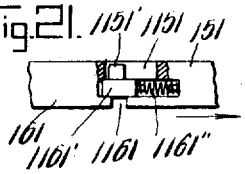
Figure 22:
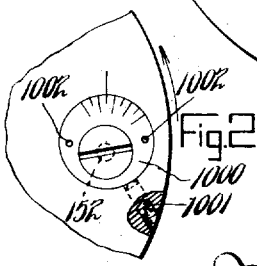

Referring to the accompanying drawings, which are made a part hereof, and on which similar reference characters indicate similar parts, Figure 1 is a view of the improved knitting machine in front elevation, part of the supporting structure being broken away for the purpose of showing the operative structure enlarged, Figure 2 is a vertical sectional view taken on line 2—2 of Figure 1, Figure 3 is a vertical sectional view taken on line 3—3 of Figure 1, Figure 4 is a horizontal sectional view taken on line 4—4 of Figure 1, Figure 5 is a top plan view of the dial and operating means, other parts being broken away forming a sectional view taken on line 5 of Figure 1, Figure 5[a] is a view taken on the same plane as Figure 5, showing a movement of the parts for unlocking and moving the cams, Figure 6 is a detail elevation of the cam operating racks as indicated by arrow 6 at Figure 5, Figure 7 is a vertical sectional view taken diametrically through the cylinder and dial on line 7—7 of Fig. 5, Figure 8 is a section on line 8—8 of Fig. 1, Figure 9 is a detail and somewhat diagrammatic view of the mechanism for actuating the dial cams, Figure 10 is a detail view in elevation of one of the blocks carried on the knitting head carrying two of the pickers, Figure 11 is an inverted plan view of the structure shown at and indicated by arrow 11 of Figure 10, Figure 12 is a view in side elevation of the switch cam and operating mechanism, Figure 13 is a view in end elevation of the switch cam and operating mechanism, Figure 14 is a view in elevation of another picker and of lock carrying the same, Figure 15 is a view of the picker shown in Figure 14, showing the manner of moving the picker relative to its block, Figure 16 is a detail sectional view of one of the pickers, Figure 17 is an inverted plan view of the cam head showing the cams in "casting off" position, Figure 18 is an inverted view of the cam head, showing the cams in knitting position, Figure 19 is an inverted plan view of the dial cap which actuates and positions the dial cams shown at Figures 17 and 18, Figure 20 is a view in elevation of the cam blocks and the associated cams removed from the cam head, Figure 21 is a fragmentary view in edge elevation of one of the cam blocks showing the means for extracting a dial needle, the view being indicated by arrow 21 at Figure 17, Figure 22 is a fragmentary top plan view of the dial head, showing the eccentric cam adjustment, Figure 23 is a detail fragmentary sectional view showing a part of the sinker ring and the mechanism for throwing the belt when the yarn accumulates at the needles for imperfect knitting, Figure 24 is a perspective view somewhat diagrammatic of the belt shifting mechanism actuated by the tripping mechanism as indicated at Figure 23, Figure 25 is a view in elevation of the belt-shifting mechanism actuated by the structure shown at Figures 23 and 24, Figure 26 is a view showing the tube knit by the machine bent at the parts knitted for the heel and toe, it being understood that as delivered from the machine the tube is a continuous straight tube with the heel and toe formed as pockets, and Figure 27 is a detail of parts shown in Figure 7, on an enlarged scale.

The drawings forming a part of this reissue application are the drawings without change of the original Patent 1,702,839 which have been transferred to this application, no change therein having been made or found necessary.

The improved knitting machine, which forms the subject matter of this application, is in a large measure, a type already well known. It comprises a base 30 supported in any approved manner as by the legs 31. Upon the base 30, a frame 32 is erected in which is journaled a drive pulley 33 upon a sleeve rigidly connected with the gear 34 and clutch member 35. Within the sleeve, shaft 36 is mounted carrying a beveled gear 37. Slidable upon the shaft 36 is a clutch member 38 adapted to engage either the clutch member 35, rigid with the pinion 34, or the clutch member 39 mounted to rotate freely upon the shaft 36. The clutch 38 is splined upon the shaft 36 so that when it is in engagement with the clutch 35, the shaft 36 and the gear 37 are driven from the movement of the clutch 35, and if the clutch member 38 is in engagement with the clutch member 39, then the shaft 36 and gear 37 are driven by the motion of the clutch 39 and gear 40 connected rigidly therewith. The gear 34 is in mesh with the gear 41 which carries a wrist pin 42 connected, by means of the pitman 43, with the hub 44 of the segment 45. The segment 45 is in mesh with the gear 40. If then the clutch member 38 is in engagement with the clutch member 35 on gear 34, the shaft 36 and gear 37 are driven continuously from the pulley 33. The rotation of the gear 34 rotates the gear 41 and oscillates the segment 45 which, by reason of its engagement with the gear 40, also rotates the gear 40 in reverse directions alternately on the shaft 36. If the clutch member 38 is in engagement with the clutch member 39, the motion from the gear 34 through the gear 41 and segment 45 to the gear 40 is transmitted to the gear 37, so that the gear 37 is rotated alternately in opposite directions, driving therewith the knitting head. In the first assumed position that of the gear 37 being continuously driven in one direction the knitting head is continuously driven for cylindrical knitting. In the second assumed position, that of the gear 37 being driven alternately in opposite directions, the knitting head is likewise so driven for reciprocal knitting.

For shifting the clutch member 38, a lever 46 is employed in engagement with a cam disk 47. The cam disk 47 is driven through the instrumentality of the ratchet wheel 48, engaged intermittently by the pawl 49. The pawl 49 is reciprocated by being pivoted to a lever 50 which is engaged by the cam block 51, carried by the hub 44 and engaging against roller 52. At each oscillation of the segment 45 the lever 50 is moved, moving the pawl 49. The pawl 49, however, is normally held out of engagement with the ratchet wheel 48 by means of a finger 53 and the pin 54 of the pawl 49. The finger 53 is connected with a spring pressed block 55 which, when lifted, will release the pawl 49 to operate ratchet wheel 48. The block 55 is lifted intermittently by lugs 56 carried on the pattern chain 57.

The structure above referred to forms no part of the present invention, it being a well known structure shown in the patent to Mayo, 726,178, April 21, 1903. Mounted concentrically with the ratchet 48, however, is a ratchet wheel 58 provided along one side adjacent the periphery with a plurality of pins 59, and other pins 60 spaced nearer the periphery than the pins 59. The ratchet wheel 58 carrying the pins 59 and 60 is actuated by means of a pawl 61, driven from a wrist pin 62 offset from the center of the gear 63, which receives power from and is rotated by the gear 41.

As the ratchet wheel 58 is rotated, the several pins 59 and 60 engage the cam lug 64 on the lever 65. Upon the lever 65 rests a rod 66 passing upwardly through the deck 67 and held yieldably downward by the spring 68. Upon the rod 66 an arm 69 is rigidly secured and positioned in sliding engagement with the deck 67 by means of a sliding pin 70. The arm 69 carries superposed racks 71 and 72, the function of which will be hereinafter more fully explained. The arrangement of parts of the well-known structure is such that as the device is driven, the actuation of the pattern chain 57 and the several ratchets operated in timed relation therewith, throws the clutch 38 to alternate the knitting from circular knitting to reciprocal knitting, and to actuate the rod 66, lifting the racks 71 and 72 by which control of the dial needles is effected for ribbed knitting.

The structure for circular knitting is substantially the same as devices already known and consists of a knitting head having a ring 73 driven from the gear 37 (see Figure 7) and mounted to rotate in the deck 67. The rotating ring 73 carries the uprights 74 and 75, the frame of which is provided with the picker 76. The picker 76 is pivoted in a ball 77, and is engaged by spring pressed guides 78 and 79. As the picker is swung in an arc as indicated at Figure 15, it engages under one of the guides 78 and 79, and is depressed, depressing thereby one of the cylinder needles by engaging the butt 80. The upright 74 also carries a spring pressed lever 81 positioned to engage a cam 82 (Figs. 5 and 7) as the head rotates so that lever 81, engaging against the lug 83 on the ball 77, returns the picker 76 when the cam 82 is in position to be engaged thereby. The cam 82 is mounted on a block 84, slidable radially in the deck 67 relative to the knitting head. The sliding movement of the cam 82 is controlled by an arm 85, carried upon a pintle 86, with an arm 87 beneath the deck 67 (see Figures 5 and 8). The arm 87 and consequently the arm 85 and cam 82, are controlled by means of a member 88 under the deck 67 having a cam slot 89. The member 88 is attached to the cam ring 90, which is mounted to rotate relatively to the deck 67, and is held from displacement by keepers 91. To move the cam ring 90 a shaft 92 is provided, having an arm 93 connected by means of a link 94 with the cam ring 90. The shaft 92 is controlled by means of a segment 95 (see Figure 4) rigidly secured to said shaft and controlled by a lever 96, pivoted upon the shaft 97 and in engagement with the groove 98 of the cam drum 99. While the utility of the cam drum 99 is well known in the art, it may be pointed out that the said drum is provided with a plurality of cam ribs 100 which engage under cam slides 101 carried by the lever 102, which in turn engages screw 103 carried by the bracket 104, by which the shaft 97 is intermittently raised and lowered acting upon the shell 105 to lengthen and shorten the cylinder stitches in the usual well-known manner. The rotation of the cam 99, also by reason of the engagement of the cam groove 98 with the lever 96 shifts the cam ring 90 (Figure 8) to actuate the slide 84, carrying the cam 82, and for other purposes hereinafter mentioned. The cam 82 is provided with a secondary cam shoulder 82′ which, when engaged by the lever 81, throws the picker 76 for a greater amplitude of movement, the movement of the slide 84 being such that the lever 81 engages either the cam shoulders 82 and 82′, or when the slide 84 is at the extreme outward limit of its movement, is not engaged at all.

The cam ring 90 is also provided with an incline 106 engaging a lever 107 (see Figure 8) controlled by the spring 108. This lever 107 is connected with the cam member 109, which is oscillated upon the center of rotation of the arm 107 as indicated at 110 in Figure 8, such number indicating only the center of rotation. The cam member 109 (see Figures 1, 12 and 13) actuates the switch cam 111. This is accomplished through the medium of a lever 112 pivoted at 113, and having a pin 114. The pin 114 is positioned to engage the cam 115 or 116 as the cam member 109 may be oscillated upon its center of rotation, bringing either the incline 115 or 116 into the path of movement of the pin 114, which is rotating with the knitting head in the direction indicated by the arrow in Figure 12. The lever 112 is provided with a segment 117, engaging a segment 118 on the switch cam 111, the same being pivoted at 119. The pivoting is such that the rotation of the switch cam 111 upon its pivot, throws it nearer to or farther from the cylinder, such cam movement being well-known but indicated at 102. The function of the switch cam is too well known in the knitting art to require explanation.

Upon opposite sides of the upright 75 pickers 121 and 122 are located, being mounted upon pintles 123 and 124 respectively, which, passing downwardly through the block 125, terminate in cam extremities 126 and 127, engaging sliding blocks 128 and 129 controlled by spring 130 (see Figures 10 and 11). The uprights 74 and 75 also carry detents 131 and 132 engaging crown ring 133, holding the said ring removably in position. The cylinder needles 134, positioned by the crown ring 133, are actuated for knitting by conventional cams.

The uprights 74 and 75 also carry the latch ring 136 and the thread guide 137.

Above the deck 67 a structure is erected, comprising an upright 138, having an annulus 139 rigidly secured thereto and concentrically overhanging the knitting head. The annulus supports a shaft 140 which in turn supports the dial 141. The annulus 139 is provided with a plurality of sliding keepers 142, which permit the rotation of the thread guide 143 and dial cam head while retaining the shaft 140 against rotation, and also against inclination, whereby the dial 141 is held rigidly concentric with the cylinder. The dial 141 is provided with dial needles 144, which are positioned to alternate with the cylinder needles 134, or such other numerical relation as the article to be knitted may require. When the cylinder needles and the dial needles are actuated to knit co-actingly at the same time, the result will be ribbed knitting as is well known in the art. As in the knitting of a stocking or a similar article, it is desirable to knit the leg portion ribbed and the foot, heel and toe portion plain, the present invention embodies more particularly means for actuating the dial needles to knit in conjunction and timed relation with the cylinder needles during such portion of the knitting process as it is desirable to knit the article ribbed, and to automatically discontinue the knitting by the dial needles when that portion of the knitting has been passed, and automatically resume knitting when it is desired to again knit the article ribbed.

For the purpose of controlling the movement of the dial needles, therefore, the dial head 145 is provided with movable cams (see Figures 17 to 20). The cams comprise two needle projecting cam members, a horse-shoe-shaped cam 146, and a crescent cam 147. The horseshoe-shaped cam 146 is rigidly secured to the block 148 pivoted at 149, and the crescent cam pivoted at 150 to the block 151 which is pivoted at 152. The block 148 is provided with a pin 153 inserted through a slot 154 in the dial head 145, while the block 151 is provided with a pin 155 inserted through the slot 156 in the dial head. Above the dial head a dial cap 157 is located provided with grooves 158 and 159 positioned to engage respectively the cam rollers 153′ and 155′ on the pins 153 and 155. As the dial cap 157 is rotated, the engagement of the pins 153 and 155 by the grooves 158 and 159 will swing the blocks 148 and 151 upon their pivots to move the cams 146 and 147 nearer to or farther from the center. The manner of rotating the cam disk 157 for the purpose, will be hereinafter more fully described.

In addition to the cams 146 and 147, the cams 160 and 161 are rigidly secured respectively to the blocks 148 and 151 so that irrespective of the movement of the blocks as indicated, a cam groove is provided between the inner cams 146 and the outer cams 160 and 161 to receive the shanks of the dial needles 144.

It is obvious that as the cams are expanded or contracted the dial needles will be moved a greater or less distance, and that as the cams 146 and 147 are movable independently as actuated by the cam disk 157, they may be actuated approximately upon opposite sides of the dial independently. The cam 147 controls the throw of the needles to cause them to knit, tuck or remain in idle position, the needles being then either bare or having stitches thereon temporarily withheld from action. The cam 146 controls the throw of the dial needles at a point not in contact with the thread and when projected causes the needles to clear their latches, and on subsequent retraction the needles will cast off their stitches.

The rib cams 160 and 161 act mainly as guard cams, but are provided respectively with points 160′ and 161′, which overhang and extend beyond the lines of the blocks 148 and 151, as shown more particularly in detail at Figure 20 and form retracting cams for the needles. The cam 160 is provided with a reduced portion 160″ to accommodate passage of the point 161′ as shown more particularly at Figure 17 while the rib cam 161 is provided with a reduced portion 161″ to accommodate the overhanging end 160′ as shown more particularly at Figure 18.

In Figure 17 the stripping or casting-off cam set is shown extended, the position of pins 153 and 155 being shown in full lines at Figure 19, while at Figure 18 the knitting cam is shown extended and the casting-off cam withdrawn, the position of pins 153 and 155 being shown in dotted lines at 153ᵃ and 155ᵃ in Figure 19.

To permit of extracting needles from the dial without removing the cam head, a needle extractor is provided shown in detail at Figure 21. This comprises a channel 1161 cut through the rib 161, so that when wholly open a needle may be withdrawn, the shank of which is contained within the cam slot of the cam head. To close this opening 1161 in normal use to prevent the accidental displacement of needles therefrom, an undercut is provided below the edge of the cam 161 in which slides a block 1161′ actuated by a spring 1161″. The block 1161′ is guided by a slot 1151 cut in the block 151 with a lug 1151′ sliding in said slot. It is obvious that the block 1161′ may be moved against the tension of the spring 1161″ to completely open the passage 1161 whereby a break in the rib cam 161 is provided, permitting the extraction of a needle therefrom.

Also it is desirable to adjust the knitting cam under certain conditions for which purpose the pivot 152 of the block 151 is integral with or carried by an eccentric 1000 set into the top plane of the cam head 145, as indicated more particularly at Figure 22 and in dotted lines of Figures 17 and 18. The eccentric 1000 is clamped and held in adjusted position by a set screw 1001 and spaced openings 1002 are provided to receive a spanner for the purpose of turning the eccentric to the required or desired adjustment.

The horseshoe cam 146 is provided adjacent its extremities with rabbets 146′ to serve as guides for the points of the crsecent cam 147. The thicknesses of the several cams are such that the outer, or in use the lower faces of the several cams 146, 147, 160 and 161 are in the same plane. From this it follows that the points of the crescent cam 147 are thinner, permitting them to ride in the rabbets 146′ without departing from the fact that the surfaces of the cams 146 and 147 remain in the same plane.

It is to be understood that the dial cap 157, together with the cam head 145 and the cams as shown at Figures 17 and 18 held in position by the cam slots 159 and 160, rotate as an organized structure by being connected directly with the driven ring 73. This connection is by means of struts 162 and 163, having openings 164 in their upper ends (see Figure 5) to receive screws 166 (see Figure 1), clamping yoke 167 thereon. The yoke 167 is rigidly secured to the sleeve 168, which embraces the stationary shaft 140 and is rigidly connected or integral with the dial plate 145, and to which the cam structure and the dial cap plate 157 are secured.

It is obvious that as long as dial cap 157 remains stationary relative to the cam head 145, the several cams shown at Figures 17, 18 and 20 will remain stationary. When, however, the dial cap 157 is rotated relative to the dial head 145, the position of the movable cams will be varied by reason of the cam slots 159 and 160, and the pins 153 and 155 engaging the same.

To provide for the rotation of the dial cap 157 relative to the cam head 145 for the purpose of moving the cams, a ratchet 169 is secured to the dial cap 157 in any approved manner as by the use of the screws 170 in the slot 171 (see Figures 5 and 5[a]).

It is obvious that the rotation of the ratchet wheel 169, secured as it is to the dial cap 157, will rotate such dial cap relative to the cam head and thereby change the cam relation of the slots 159 and 160 to the cam head 145 and pins 153 and 155. This relative rotation is provided by means of a pawl 172 which engages the ratchet wheel 169, and the parts are normally locked against movement by a detent 173. During the normal rotation of the parts, the detent 173 is in locking engagement as shown at Figure 5. To move the dial cap 157, it is necessary first to unlatch the detent 173. This is accomplished by means of a disk 174 having a wrist pin 175 upon which is pivoted the pawl 172, said wrist pin also engaging against a cam shoulder 176 of the detent 173 as the disk 174 is rotated in the direction indicated by the arrow at Figures 5 and 5[a], which first unlatches the detent 173 and by further movement of the pawl 172 against the ratchet turns the ratchet and therewith the dial cap. A spring 177 spans the interval between the pawl 172 and the detent 173 for holding such members yieldingly in engagement with their coacting elements and against movement engendered by the wrist pin 175. The pawl 172 is free to travel with the wrist pin 175 and with the detent unlocked as shown at Figure 5[a], the rotation of a disk 174 in the direction indicated by the arrow (Figure 19) will rotate the ratchet wheel 169 step by step in the direction indicated by its arrow, it being understood that such rotation is relative to the cam head 145. Although such rotation is also in direction of normal rotation of the knitting head, such normal knitting rotation is not referred to at the present time. The detent 173 is pivoted at 178 to an arm 179 carried rigidly by the strut 163.

The disk 174 is mounted upon the upper end of a shaft 180 (see Figure 1), with a pinion 181 mounted upon the lower end of such shaft, positioned to engage with either rack 71 or 72 as the said racks are lifted to the proper plane by the rod 66 as hereinbefore explained. It will be noted, especially from Figure 9, that the pins 59 are nearer the center of the pattern wheel 58 than the pins 60. It follows, therefore, that the pins 60, when engaging the lug 64, will lift the rod 66 to a greater altitude than the pins 59. When lifted by a pin 60, the rack 71 is brought into the proper plane for engagement with the pinion 181. When lifted by the pins 59 the rack 72 is brought into the plane for engaging the pinion 181. As the two racks 71 and 72 occupy different arcs about the knitting head, it is obvious that the advance of the dial cap will take place at different intervals during the rotation of the knitting head dependent upon whether the pinion 181 is actuated by the rack 71 or the rack 72.

The cam slot 159 provides for the positioning of the cams 147 and 161 farther from or nearer to the center of the dial cap, so that the dial needles may knit or tuck as the exigencies of knitting may make desirable, or will be wholly withdrawn from knitting position and the stitches cast off or not according to the position of the cams controlled by the slot 158. When the dial cap 157 has been rotated to such position that the curve 182 of the slot 158 engages the pin 153, the dial needles are thrown out approximately to the extreme of their movement by their cam 146 and so will clear their latches but not being in position to engage the thread they will cast off the work when retracted. A similar operation serves to open the latches of the dial needles when they are first brought into action, thus preparing them to take yarn at the yarn-feed, when again projected by cam 147.

In the knitting of tubular fabrics wherein pockets are knitted for heel and toe, and also in other stages in the knitting it has been found difficult or impossible to provide the necessary tension upon the goods to produce good stitches owing to the fact that the pockets provide a looseness not overcome by the resiliency of the thread, and furthermore in order to knit rib fabric it is necessary that the rib wales be maintained under sufficient tension to permit the latches of the said dial needles to clear their stitches. Otherwise the loops accumulate within the hooks of the dial needles and the dial needles tuck. The rib wales are ordinarily tensioned by means of take-up rolls which exert a constant pull or tension on the fabric. In addition to tensioning the rib wales during the knitting of rib fabric it is desirable during heel reciprocal knitting to take up or maintain tension upon the plain wales constituting the heel, and to maintain such tension upon the plain wales as well as the rib wales during the knitting of the first few courses of all around rib knitting. Unless some provision is made for maintaining the heel pouch or pocket and initial rib wales under tension, difficulty is experienced, upon the resumption of rib knitting in casting the stitches from the latches of the dial needles and in preventing stitches cast off over the hooks of dial needles from again being caught by the hooks of the dial needles during the knitting of a succeeding course, until a sufficient length of fabric has been knit to permit the regular take-up to take hold of the heel pouch.

To provide for proper feeding of the fabric during such reciprocal knitting a plurality of springs 183 are secured to the underside of the dial as indicated more particularly at Figures 7 and 8. The sinkers 184 are in the active, take-up or tensioning position shown in Fig. 27 when the dial needles are clearing their stitches from their latches. The sinkers 184 are provided with points or extremities 185 which engage the fabric 186 between such points and the springs 183, so that as the sinkers are actuated by the sinker ring 187, the points 185 push the fabric away from the needles thereby insuring the proper tension for knitting so that upon the resumption of rib knitting the dial needles will clear their stitches.

Thus the toothed sinkers or webholders 184 act in conjunction with the springs 183, first, to tension the rib wales during the knitting of rib fabric and, second, to tension the plain wales of the heel pouch so that in either case, upon the resumption of rib knitting, the dial needles will clear their latches and their hooks will not again engage cast off stitches.

Although the springs 183 herein shown may be more or less rigid and substantially unyielding nevertheless it is desirable that the cooperative relations of the sinkers or webholders 184 and the springs 183 be such that either the sinkers or springs may give slightly to the stress of the fabric. Otherwise the toothed sinkers 184 may cut the forming fabric engaged between the teeth 185 of the webholders 184 and the undersides of the members 183. Furthermore the forming fabric being yieldingly engaged between the toothed webholders 184 and springs 183 avoids the necessity of adjustments whenever a change is made in the stitch length or in the thread or yarn fed to the needle as from a fine yarn to a coarse yarn or vice versa.

A safety appliance to prevent breakage when yarn accumulates at the needles from imperfect knitting or any cause, is provided in the lever 188 pivoted to the sinker ring 187 at 189, and provided with a pin 190. The lever 188 is provided with a cam surface 191 properly positioned to engage the outer ends 192 of the sinkers. When there is an accumulation of thread from imperfect knitting, the sinkers are forced out as indicated at 193 (see Figure 23) until the ends 192 extend beyond the normal circumference whereupon they engage upon the cam surface 191 of the lever 188, forcing it from normal or dotted position in Figure 23 until it is in position to engage the extremity of the lever 194 pivoted upon an upright 195. The lever 194 engages a shoulder 196 in a rod 197 (see Figure 24) vertically slidable through the deck 67 and through keepers 198, attached to the frame 32. A spring 199 is provided, surrounding the rod 197 and held under tension with the rod 197 upwardly when the lever 194 is in engagement with the shoulder 196, but adapted to throw the rod 197 downwardly with considerable force when the lever 194 is disengaged from the shoulder 196. The rod 197 bears at its lower end upon a member 200 pivoted at 201 to a plate 202 mounted to slide in guides 203 attached to or forming part of the frame 32. The member 200 is provided with a shoulder 204 adapted to hook over one of the guides 203 and is held in such engagement yieldingly by the spring 205. The spring 205, as will be noted, is secured at one end to detent 203 on the frame 32 and at the opposite end to the member 200, which, being pivoted to the plate 202, is adapted to slide the said plate 202 when the shoulder 204 is released from engagement with the detent 203. The plate 202 carries a belt guide 206 (see Figures 1 and 25) through which the belt 207 passes about the pulley 33 which, when moved, shifts the belt from the tight to the loose pulley in the usual well-known manner. Means is also provided for actuating the device manually by means of a lever 208 (see Fig. 1) connected with a shaft 209 (see Fig. 23) which in turn carries a bifurcate finger 210, engaging a pin 211 on the locking member 200 so that the depression of the lever 208 releases the shoulder 204 and permits the spring 205 to throw the belt guide 206 above described.

In the operation of knitting a fabric to be converted into stockings by being severed and finished in the usual manner, a tubular fabric is constructed which is imperfectly illustrated at Figure 26. In view of the fact that the heel and toe are knitted into the otherwise cylindrical fabric pockets, an attempt has been made to illustrate this by bending the tubular fabric at the line of widening or narrowing for these pockets, it being understood of course that as the fabric is delivered from the machine it has the appearance of a tube with spaced pockets or bulges thereon. The present machine knits the fabric from that portion intended for the toe through the foot and heel into and through that portion intended for the leg. As illustrated at Figure 26 the leg portion 212 is knitted, and by reason of the several pins 59 and 60 in the pattern wheel 58, the cams 146 and 147 are actuated to produce the several welts indicated at 213 by moving the dial cams to cause the dial needles to tuck for one or more courses and then returning them to knitting position. At 214 the dial needles 144 are actuated by the cam 146 through the medium of the pin 153, reaching the portion 182 of the slot 158 whereby the stitches upon the dial needles are cast off. Later this fabric is severed at 214 and that portion then forming the top of the leg of stocking finished in any usual and well known manner. This severing, however, occurs after the fabric is removed from the machine, the machine continuing to knit the tubular portion 215 until the line 216 is reached, the portion between the line 214 and 216 being employed in looping and welting. At line 216 the pocket for the toe is begun and by reciprocal knitting the pocket extending from the line 216 to line 217 is produced. The portion of the pocket thus produced is turned and secured to the foot portion 218 in the usual well-known manner. The foot portion 218 is plain circular knitting until the line for the pocket for the heel is reached at 219. Reciprocal knitting is again employed from the line 219 to 220, forming the pocket for the heel. Plain cylindrical knitting at 221 is then continued for such distance may be found desirable to again take up rib knitting for the leg, indicated at 222. This ribbing 222 is continued throughout such length as may be provided by the pattern chain 57, being finished as at 213 for the top of the leg. This cycle of operation is continued indefinitely and the tubular fabric thus produced is severed as indicated at the lines 214 and 216 into the required length for producing hosiery.

In the drawings an attempt has been made to illustrate a completely operative structure but in most cases, those elements of the machine which are well known in the knitting art and which do not directly have any function in carrying forward the present invention, are not described or supplied with reference characters. It is believed, however, that the structure disclosed either in its identical form or a form so nearly resembling the identical form, is so well known that the operation and functions are obvious without such descriptive matter.

It will be obvious to those skilled in the art that various changes may be made in this device without departing from the spirit of the invention and therefore this applicant does not limit itself to what is shown in the drawings and described in the specification, but only as indicated by the appended claims.

Having thus fully described said invention, what is claimed as new and desired to secure by Letters Patent, is:

1. In a knitting machine the combination with cylinder needles and means for actuating the same, of a dial and dial needles positioned to coordinate with the cylinder needles, a cam structure adapted to actuate the dial needles and adjustable to vary the movement of the needles, a dial cap provided with means for adjusting the cam, means to normally lock the dial cap relative to the cam structure, a pinion, means connected with the pinion to release the lock and advance the dial cap with a step-by-step movement, a rack, a pattern wheel, and means actuated from the pattern wheel for interposing the rack in the path of movement of the pinion to actuate the pinion at predetermined intervals.

2. In a knitting machine the combination with cylinder needles and means for actuating the same, of a dial and dial needles positioned to coordinate with the cylinder needles, a cam structure rotatable relative to the dial, a cam carried by the cam structure adapted to actuate the dial needles and capable of adjustment to vary the movement of the dial needles, a dial cap, means carried by the dial cap for adjusting the cam, means rotating with the cam structure normally locking the dial cap against rotation relative to the cam structure, a pinion, means connecting the pinion with the lock and rotating with the cam structure, segmental racks occupying different arcs about the periphery of the cam structure, a pattern wheel, and means actuated from the pattern wheel for moving either of said segmental racks selectively into the path of movement of the pinion.

3. In a knitting machine the combination with cylinder needles and means for actuating the same, of a dial and dial needles positioned to coordinate with the cylinder needles, a rotating cam structure adapted to move the dial needles, a cam carried by the cam structure and capable of adjustment to vary the movement of the dial needles, a dial cap carried by the cam structure and rotatable relative thereto to adjust the cam, a cap-locking and moving structure rotating with the cam structure and embodying a detent for locking and a pawl for moving the cap with a step-by-step movement, a pinion connected to and adapted to actuate the detent and pawl, segmental racks rigidly connected and occupying different horizontal planes and different arcs about the rotating structure, a pattern wheel, and means actuated from the pattern wheel for raising the segmental racks to bring either of said racks into the plane and path of movement of the pinion.

4. A knitting machine, a dial and dial needles, a cam plate rotatable relative to the dial and carrying needle-actuating cams, a dial cap rotatable relatively to the cam plate and carrying means for adjusting the cams, a shaft, a bearing therefor rotating with the cam plate, means to lock the dial cap against movement relative to the cam plate, means carried by the shaft to release the lock and move the dial cap with a step-by-step movement, a pinion carried by the shaft, a plurality of segmental racks occupying different horizontal planes and different arcs about the path of movement of the pinion, a pattern mechanism, and means actuated from the pattern mechanism to move the segmental racks selectively into the plane of rotation of the pinion.

5. In a knitting machine a dial and dial needles, a cam plate rotatable relative and adapted to drive the dial needles, movable cams carried by the cam plate and adapted when adjusted to vary the movement of the dial needles, a dial cap carried by the cam plate and embodying means for adjusting the position of the cams, a shaft in parallelism with the axis of rotation of the cam plate and rotating about such axis as its center of rotation, a detent positioned to lock the dial cap against movement, means carried by the shaft for releasing the lock, a pawl actuated by the rotation of the shaft to move the dial cap relative to the cam plate, a pinion carried by the shaft, a plurality of segmental racks occupying different horizontal planes and arcs relative to the rotation of the shaft, a pattern mechanism, and means actuated from the pattern mechanism to selectively move one of said segmental racks into the plane of rotation of the pinion.

6. In a knitting machine the combination of two sets of needles and means for actuating them, and pattern mechanism for controlling the actuating means to produce ribbed, plain circular or reciprocating knitting, said actuating means including a dial cam structure embodying a plurality of adjustable needle-projecting cams for the dial needles, a dial cap, independent pin and slot connections between the cams and the cap, and connections to said pattern mechanism to actuate the cap for moving said cams, substantially as set forth.

7. In a knitting machine, two sets of needles, means for actuating them comprising a dial cam plate, a movable needle projecting cam thereon, and means to move said cam to vary the action of the needles, comprising a cam cap movable step-by-step in a forward direction relatively to the dial cam plate, substantially as set forth.

8. In a knitting machine, two sets of needles and means for actuating them comprising a dial cam plate, a movable needle projecting cam thereon, and means to move said cam to idle, tuck and knitting positions, comprising a member mounted to move about the dial post and operatively connected to said cam, and means for positively moving said member step-by-step about said post, substantially as set forth.

9. In a knitting machine, two sets of needles and means for actuating them comprising a dial cam plate, a movable needle projecting cam thereon, and means to move said cam to idle tuck and knitting positions, comprising a cam cap mounted to move about the dial post, and maintaining a positive control over said cam at all times, substantially as set forth.

10. In a knitting machine a cam head comprising a substantially plain disk, a horseshoe cam movable toward and from the center of the disk, a crescent cam having its points embracing the extremities of the horseshoe cam and movable toward and from the center of the disk, rib cams surrounding the horseshoe cam and the crescent cam and movable therewith, producing an expansible and contractible elliptical cam groove, and means to move the horseshoe cam and the crescent cam independently.

11. In a knitting machine a cam head comprising a substantially plain disk, blocks movable upon the disk toward and from each other, a crescent cam carried by one of said blocks, a horseshoe cam carried by the other of said blocks having its extremities disposed between the points of the crescent cam, and rib cams surrounding and spaced from the horseshoe cam and the crescent cam and movable therewith.

12. In a knitting machine a cam head comprising a disk, blocks movable upon the face of the disk toward and from the center, a crescent cam carried by one of said blocks, a horseshoe cam carried by the other of said blocks and having its extremities disposed between the horns of the crescent cam, overlapping rib cams carried by the blocks spaced from the horseshoe cam and the crescent cam, and means to move the blocks and their associated cams independently.

13. In a knitting machine a cam head comprising a disk, blocks movable upon the face of the disk toward and from the center, a crescent cam carried by one of said blocks, a horseshoe cam carried by the other of said blocks, having its extremities rabbeted and disposed between the horns of the crescent cam with the horns moving in the rabbets, overlapping rib cams carried by the blocks spaced from and surrounding the crescent cam and the horseshoe cam, and means to move the blocks and their attached cams independently relative to the disk.

14. In a knitting machine a cam head embodying a disk, blocks movable upon the face of the disk toward and from the axis, arcuate cams carried by each of said blocks, the extremities of the arc of one cam embracing the extremities of the arc of the other cam, limiting cams spaced from and surrounding the arcuate cams and carried by the blocks, and means to move the blocks and their associated cams independently relative to the disk.

15. In a knitting machine a cam head embodying a disk, blocks movable upon the face of the disk toward and from the axis, an arcuate cam carried by each of said blocks, the extremities of one arc being interposed between the extremities of the other arc, overlapping rib cams spaced from and surrounding the arcuate cams and carried by the blocks and means to move the blocks and their associated cams independently relative to the disk.

16. In a knitting machine a cam head embodying a rotatable disk, arcuate cams movable upon the face of the disk, overlapping rib cams spaced from and surrounding the arcuate cams, one of said rib cams having a channel cut therethrough and a movable closure for the channel.

17. In a knitting machine a cam head embodying a rotatable disk, blocks movable upon the face of the disk, overlapping arcuate cams carried by the blocks, overlapping rib cams carried by the blocks spaced from and surrounding the arcuate cams, one of said rib cams being provided with a slot cut therethrough and a closure for the slot.

18. In a knitting machine a cam head embodying a rotatable disk, blocks movable upon the face of the disk, overlapping arcuate cams carried by the blocks, overlapping rib cams carried by the blocks, spaced from and surrounding the arcuate cams, one of said rib cams being provided with a channel cut therethrough, and a circumferentially sliding closure for the channel.

19. In a knitting machine a cam head embodying a rotatable disk, blocks pivoted adjacent the periphery of the disk and movable upon such pivots toward and from the axis, a crescent cam pivoted to one of said blocks, a horseshoe cam secured to the other of said blocks having its extremities disposed between the horns of the crescent cam, rib cams carried by the blocks spaced from the crescent cam and the horseshoe cam, and having extremities extending beyond the lines of its block to overlap the rib cam of the other block, and means to move the cams independently relative to the disk.

20. In a knitting machine, a dial cam plate having a cam groove for the needle-butts, a needle projecting cam at one side of the slot, a guard cam opposed thereto and having a slot opposite the high point of the needle-projecting cam, and a circumferentially slidable closure for the slot, substantially as set forth.

21. In a knitting machine, a dial cam plate, an adjustable arcuate needle-projecting cam thereon, an arcuate guard cam movable therewith, said guard cam having a slot for entry and removal of needles substantially opposite the high point of the needle-projecting cam, and a closure therefor, substantially as set forth.

22. In a knitting machine, two sets of needles, means for actuating them, pattern mechanism to control said actuating means to produce ribbed, plain circular or reciprocating knitting, means for taking up the forming fabric during reciprocating knitting comprising webholders engaging the margin of the forming fabric and also engaging a face thereof at a distance from the margin, and leaf springs on the dial intersecting the line of movement of the web holders whereby the forming fabric is pinched between the web holders and the springs and drawn away from the knitting point, substantially as set forth.

23. In a knitting machine two sets of needles, means for actuating them, pattern mechanism to control said actuating means to produce ribbed, plain circular or reciprocating knitting, means for taking up the forming fabric during reciprocating knitting comprising webholders engaging the margin of the forming fabric and also engaging the outer face thereof at a distance from said margin, and springs on a segment of the dial adapted to coact with said webholders in withdrawing the forming fabric away from the knitting point, substantially as set forth.

24. In a rib knitting machine, a dial, a cylinder, horizontal webholders at the upper end of the cylinder having ends extending beneath the dial and a flat spring on the dial extending over a plurality of web holders and coacting with said ends to take up the forming fabric, substantially as set forth.

25. In a knitting machine, a dial cam head, a shiftable cam thereon, said head having an opening, a disk rotatable in said opening and an eccentric pin on said disk engaging an opening in the cam and forming a pivot therefor substantially as set forth.

26. In a knitting machine, a shiftable cam, a pivot for the cam, an eccentrically adjustable support for said pivot, and means to secure the pivot in adjusted position substantially as set forth.

27. In a knitting machine a dial cam plate, a block thereon pivoted at one end, knitting cams on said block, an adjustable eccentric support for the pivot, and means for holding the same in adjusted position, substantially as set forth.

28. In a knitting machine, a dial cam head having a cam groove on its under face, one or more rib cams forming the outer wall of the groove said wall having a slot therethrough, and a circumferentially slidable closure for said slot, substantially as set forth.

29. In a dial and cylinder knitting machine, a dial cam head, blocks pivoted at opposite sides of the cam head, inner and outer cams on each block overlapping to provide a closed cam groove on the head, and pattern-controlled mechanism to move said cam blocks into various positions, substantially as set forth.

30. In a knitting machine the combination of two sets of needles, means for actuating them and pattern mechanism for controlling the actuating means to produce ribbed, plain circular or reciprocating knitting said actuating means including a dial cam structure comprising a disk, blocks pivoted on the disk, and inner and outer cams on the blocks forming a closed needle race in all positions of the blocks. substantially as set forth.

31. In a knitting machine, a set of dial needles, a set of cylinder needles, means for operating them and pattern mechanism to control the operation of the needles to produce ribbed, plain circular or reciprocatory knitting said operating means including a dial cam head, a needle-projecting knitting cam and a needle-projecting casting-off cam on said head, a pin fixed in relation to each of said cams and a pattern controlled cam cap having separate grooves engaging said pins for positioning said cams variously during the knitting operation, substantially as set forth.

32. In a knitting machine, a set of dial needles, a set of cylinder needles, means for operating them and pattern mechanism to control the operation of the needles to produce ribbed, plain circular or reciprocatory knitting said operating means including a dial cam head, a needle-projecting knitting cam and a needle-projecting casting-off cam on said head, a pattern-controlled member above the head rotatable relatively thereto, means for advancing said member step by step and connections from said member to each of said cams for positioning them variously during the knitting operation, substantially as set forth.

33. In a knitting machine, two sets of needles, operating means therefor, pattern mechanism controlling the operation of the machine to produce ribbed, plain circular or reciprocating work, said operating means comprising a dial and a dial cam head, movable blocks on said dial cam head, an independently movable needle cam on one of said blocks, a cam fixed to the other block adjacent to said independently movable cam, rabbets on one of said cams, and horns on the other engaging over the rabbets said rabbets being adapted to engage the needle butts and prevent them from striking said horns, substantially as set forth.

34. In a knitting machine, two sets of needles, means for actuating them, pattern mechanism to control said actuating means to produce ribbed, plain circular or reciprocating knitting, and means for taking up the forming fabric during reciprocating knitting comprising webholders engaging the margin of the forming fabric and also engaging a face of the fabric at a distance from the margin, and springs at the opposite side of the fabric-coacting with the web holders, substantially as set forth.

35. In a knitting machine, a dial cam support, a pair of needle cams having studs, a positioning cam having grooves engaging the studs and pattern controlled means to adjust the positioning cam and hold it in adjusted position, substantially as set forth.

36. In a knitting machine, a dial cam support, a pair of needle cams, a compound positioning cam in engagement with both of the needle cams, a ratchet on the positioning cams, an operating pawl, a shaft carrying the pawl, and pattern controlled means for operating the shaft, substantially as set forth.

37. In a knitting machine, a dial cam plate, an adjustable cam thereon, a rotary positioning cam resting on the plate and connected to the cam, a ratchet on the positioning cam, a driving pawl, a star-wheel, for actuating the pawl and pattern-controlled mechanism to drive the star-wheel, substantially as set forth.

38. In a knitting machine, a dial cam plate, an adjustable cam thereon, a rotary positioning cam resting on the plate and connected to the cam, a ratchet on the positioning cam, driving and locking pawls engaging the ratchet and pattern-controlled means to operate said pawls, substantially as set forth.

39. In a knitting machine, a dial cam plate, a movable cam thereon, a positioning cam on the plate connected to the movable cam, a ratchet on the positioning cam, a vertical shaft having an eccentric wrist-pin, a pawl on the wrist-pin for driving the ratchet, a second pawl on a fixed support adapted to lock the ratchet against rotation, said wrist-pin also disengaging said locking pawl from the ratchet, and pattern-controlled means to drive said shaft, substantially as set forth.

40. In a knitting machine having a rotary head the combination of a pinion rotating with the head and connected to a needle-actuating cam, a rack for rotating the pinion to vary the position of the cam, means for moving the rack into and out of position for engaging the pinion, and means for maintaining the rack in a position such that its teeth will mesh with those of the pinion when brought into engaging position, substantially as set forth.

41. In a knitting machine, a set of cylinder needles, a set of dial needles, dial and cylinder cams moving in synchronism about the axis of the machine, a dial cap normally movable with the dial cams about said axis, means on the dial cap for varying the positions of the dial cams, and means for advancing said dial cap at intervals relative to the dial cams, substantially as set forth.

42. In a knitting machine, a set of cylinder needles, a set of dial needles, means for actuating the respective sets of needles said means being positioned about the axis of the knitting machine in fixed angular relation to each other, a cap on the dial rotatable about the axis of the machine for varying the operation of the actuating means for the dial needles, and means for moving the cap step-by-step about said axis, substantially as set forth.

43. In a knitting machine, a set of cylinder needles, a set of dial needles, a dial cam, and a cylinder cam movable in fixed relation to each other about the axis of the knitting machine, a dial cap normally movable with said dial and cylinder cams about said axis, means on the dial cap for adjusting said dial cam to vary the action of the dial needles, and means for moving the dial cap incrementally relative to the dial and cylinder cams, substantially as set forth.

44. In a knitting machine, a set of cylinder needles, a set of dial needles, needle cams for the respective sets of needles positioned about the axis of the machine in fixed angular relation to each other, a cap on the dial connected to a dial needle cam for adjusting it to vary the action of the dial needles, and means for moving said cap incrementally in one direction, substantially as set forth.

45. In a knitting machine, a set of cylinder needles, a set of dial needles, needle cams for the respective sets of needles positioned about the axis of the machine in fixed angular relation to each other including a knitting cam and a casting-off cam on the dial, a rotary cap connected to the dial cams for adjusting them to vary the action of the dial needles, and means for moving said cap incrementally in one direction, substantially as set forth.

46. In a knitting machine, a set of cylinder needles, a set of dial needles, needle cams for the respective sets of needles positioned about the axis of the machine in fixed angular relation to each other, a cap on the dial connected to a dial needle cam for adjusting it to vary the action of the dial needles, means for normally locking the dial cap against independent movement, and means to release the cap and move it step-by-step in one direction at predetermined intervals, substantially as set forth.

47. In a knitting machine, a set of cylinder needles, a set of dial needles, dial and cylinder cams moving in synchronism about the axis of the machine, a dial cap normally movable with the dial cams about said axis, means on the dial cap for varying the position of a dial cam, means for normally locking said cap against independent rotation, means to unlock the cap at predetermined intervals, and means to rotate said cap relative to said dial cam while unlocked, substantially as set forth.

48. In a rib knitting machine, a dial, a cylinder, means on the dial adapted to act resiliently against a portion of the forming fabric, and a circular series of web-holders engaging the other face of the fabric certain of said webholders coacting with said resilient means to draw the fabric from the knitting point, substantially as set forth.

49. In a knitting machine, two sets of needles, means for actuating them, pattern mechanism to control said actuating means to produce ribbed, plain circular or reciprocating knitting, and means for taking up the forming fabric during reciprocating knitting comprising a circular series of radially movable webholders, and means for resiliently pressing on the fabric in opposition to one or more of the webholders active during reciprocating knitting, substantially as set forth.

50. In a knitting machine, a dial cam support, a pair of needle-projecting cams thereon, a positioning cam resting on the cam support, and connections from said positioning cam to the needle-projecting cams for positively adjusting the cams and holding them positively in each position of adjustment, substantially as set forth.

51. In a knitting machine a dial cam support, a pair of needle cams thereon, and a positioning cam on the support having means on one face for positively adjusting the needle cams and positively holding them in adjusted position, substantially as set forth.

52. In a knitting machine, a dial cam support, a pair of movable needle-projecting cams and a compound positioning cam constantly in engagement with both of said needle-projecting cams, substantially as set forth.

53. In a knitting machine, a dial cam plate, a needle-projecting cam, and a cam on the dial cam plate for positively moving the needle-projecting cam to active and inactive positions and positively holding it in each of such positions, substantially as set forth.

54. In a knitting machine, a dial cam plate, a needle-projecting cam thereon, and a cam constantly connected to said needle-projecting cam said cam being rotatable independently of the needle-projecting cam and being adapted to move the needle-projecting cam to idle, tuck, and knitting positions and positively hold it in each of such positions, substantially as set forth.

55. In a knitting machine, a dial cam plate, an adjustable cam thereon, a rotary positioning cam resting on the plate and connected to the adjustable cam, pattern-controlled means to rotate the positioning cam relatively to the cam plate, and pattern-controlled means to lock the positioning cam against rotation, substantially as set forth.

56. In a knitting machine, a dial cam plate, a knitting cam, and means for controlling it comprising a positioning cam superposed on the dial cam plate, and a stud movable with the knitting cam said positioning cam having in its lower face a cam-path for engagement with said stud whereby the dial cam may be adjusted to produce varying effects in the fabric, substantially as set forth.

57. In a rib knitting machine a dial, a cylinder, means on the dial positioned to act resiliently against a portion of the forming fabric, and webholders moving into and out of engagement with the other face of the fabric at each rotation of the machine said webholders coacting with said resiliently acting means for drawing the fabric from the knitting point, substantially as set forth.

58. In a dial and cylinder knitting machine, a set of cylinder needles, a set of dial needles, means for actuating the needles, pattern mechanism controlling said actuating means to cause the needles to knit ribbed, plain circular or reciprocating work in desired order, means for taking up the forming fabric during reciprocating knitting including special webholders in the segment of the needle circle where fabric is formed during reciprocating knitting said special webholders having points for engagement with one face of the fabric, and means on the under side of the dial for engaging the other face of the fabric to hold the fabric in engagement with the points of said special webholders, substantially as set forth.

59. In a rib knitting machine, a dial, a cylinder, means on the dial adapted to act against a portion of the forming fabric, and a circular series of webholders engaging the other face of the fabric, certain of said webholders coacting with said means on the dial to draw the fabric from the knitting point, the webholders and means on the dial adapted relatively to yield to the stress of the forming fabric, substantially as set forth.

60. In a knitting machine, two sets of needles, means for actuating them, pattern mechanism to control said actuating means to produce ribbed, plain circular or reciprocating knitting, and means for taking up the forming fabric comprising a circular series of radially movable webholders, and means for engaging the fabric in opposition to one or more of the webholders, the webholders and means for engaging the fabric in opposition thereto adapted relatively to yield to the stress of the forming fabric, substantially as set forth.

61. In a dial and cylinder knitting machine, a set of cylinder needles, a set of dial needles, means for actuating the needles, pattern mechanism controlling said actuating means to cause the needles to knit ribbed, plain circular or reciprocating work in desired order, means for taking up the forming fabric including special webholders said special webholders having points for engagement with one face of the fabric, and means on the underside of the dial for engaging the other face of the fabric to hold the fabric in engagement with the points of said special webholders, the webholders and means on the underside of the dial adapted relatively to yield to the stress of the forming fabric, substantially as set forth.

62. In a knitting machine, two sets of needles, means for actuating them, pattern mechanism to control said actuating means to produce ribbed, plain circular or reciprocating knitting, and means for tensioning rib wales comprising web holders engaging the margin of the forming fabric and also engaging a face of the fabric at a distance from the margin, and means at the opposite side of the fabric coacting with the webholders, one of the two means last mentioned adapted to exert yielding tension upon the said rib wales, substantially as set forth.

63. In a knitting machine, two sets of needles, means for actuating them, pattern mechanism to control said actuating means to produce ribbed, plain circular or reciprocating knitting, means for taking up the forming fabric during knitting comprising web holders engaging the margin of the forming fabric and also engaging a face thereof at a distance from the margin, and means on the dial intersecting the line of movement of the webholders whereby the forming fabric is pinched between the webholders and the said means and drawn away from the knitting point, the webholders being adapted to engage one face of the forming fabric and the means on the dial constituting other means adapted to engage the other face of the forming fabric, one of said last two mentioned means adapted to yield under stress of the forming fabric, substantially as set forth.

64. In a knitting machine, two sets of needles, means for actuating them, pattern mechanism to control said actuating means to produce ribbed, plain circular or reciprocating knitting, means for taking up the forming fabric during knitting comprising webholders engaging the margin of the forming fabric and also engaging a face thereof at a distance from the margin, and means on the dial intersecting the line of movement of the webholders whereby the forming fabric is pinched between the webholders and the said means and drawn away from the knitting point, the webholders being adapted to engage one face of the forming fabric and the means on the dial constituting other means adapted to act resiliently against the forming fabric, and in opposition to the other means, substantially as set forth.

65. In a knitting machine adapted to knit rib fabric, two sets of needles, webholders adapted to act in conjunction with one set of needles for the knitting of plain wales, a plate upon one face of which are supported the other set of needles, means on the other face of said plate and other means constituting portions of the webholders adapted to act in conjunction with the aforesaid means on the plate, the forming fabric being adapted to pass between the aforesaid means on the plate and the web holders, the means on the plate and web holders being adapted yieldingly to engage the forming fabric between them and thereby maintain the rib wales under tension, substantially as set forth.

66. In a knitting machine, a needle dial, a needle cylinder and a sinker head, needles mounted in the dial and cylinder, sinkers mounted in the sinker head for movements radially of the needle cylinder, means on the dial and means on the sinkers adapted to coact in a yielding manner to tension the wales of forming fabric passing between them, substantially as set forth.

67. In a knitting machine, a dial and a cylinder, needles mounted therein, webholders mounted adjacent to the needle cylinder for radial sliding movements and when so moving acting to tension the wales of the forming fabric, means on the underside of the dial acting in conjunction with the aforesaid webholders so that when the webholders are moved in the direction of the said means on the dial, fabric wales are held in position to be engaged by the said webholders, substantially as set forth.

68. In a knitting machine, a dial and a cylinder, needles mounted therein, toothed webholders mounted adjacent to the needle cylinder for radial sliding movements and when so moving acting to tension the wales of the forming fabric, means on the underside of the dial acting in conjunction with the aforesaid webholders so that, when the webholders are moved in the direction of the said means on the dial, fabric wales are held in position to be engaged by the teeth of the said webholders, substantially as set forth.

69. A circular knitting machine including a needle dial, cylinder and sinker head, needles mounted in the dial and cylinder and sinkers mounted in the sinker head, means on the dial acting in opposition to some of the sinkers yieldingly to tension some of the wales only, substantially as set forth.

70. A circular knitting machine including a needle dial, cylinder and sinker head, needles mounted in the dial and cylinder and sinkers mounted in the sinker head, means on the dial acting in opposition to some of the sinkers yieldingly to tension at least some of the wales, substantially as set forth.

71. A circular knitting machine including a cylinder, dial and sinker head, needles mounted in the cylinder and dial for independent movements and sinkers mounted in the sinker head for independent movements, some at least of the webholders being provided with web engaging teeth, means on the dial, the last named webholders acting in opposition to the means on the dial whereby yieldingly to tension some at least of the wales so that dial needles may properly cast off their stitches while knitting their first rib stitches, substantially as set forth.

72. A knitting machine, having rib and plain needles and including two sets of members acting to position the knitted fabric so that rib stitches will be cast off the rib needles, one of said sets of members being resilient, substantially as set forth.

73. In a rib knitting machine, a dial, a cylinder, means on the dial adapted to act against a portion of the forming fabric, and a circular series of webholders engaging the other face of the fabric, certain of said webholders coacting with said means on the dial to draw the fabric from the knitting point, substantially as set forth.

74. In a knitting machine, two sets of needles, means for actuating them, pattern mechanism to control said actuating means to produce ribbed, plain circular or reciprocating knitting, and means for taking up the forming fabric comprising a circular series of radially movable webholders, and means for engaging the fabric in opposition to one or more of the web holders, substantialy as set forth.

75. In a dial and cylinder knitting machine, a set of cylinder needles, a set of dial needles, means for actuating the needles, pattern mechanism controlling said actuating means to cause the needles to knit ribbed, plain circular or reciprocating work in desired order, means for taking up the forming fabric including special webholders said special webholders having points for engagement with one face of the fabric, and means on the underside of the dial for engaging the other face of the fabric to hold the fabric in engagement with the points of said special webholders, substantially as set forth.

In witness whereof, May Hosiery Mills has hereunto set its hand and seal at Nashville, Tennessee, this 6th day of January, A. D. one thousand nine hundred and thirty-one.

NAPOLEON J. PERRY, Deceased. [L. S.]
By MAY HOSIERY MILLS, Assignee,
By JACOB MAY,
*Its President.*